US007162607B2

(12) United States Patent
Macy et al.

(10) Patent No.: US 7,162,607 B2
(45) Date of Patent: Jan. 9, 2007

(54) APPARATUS AND METHOD FOR A DATA STORAGE DEVICE WITH A PLURALITY OF RANDOMLY LOCATED DATA

(75) Inventors: William W. Macy, Palo Alto, CA (US); Eric Debes, Santa Clara, CA (US); Igor V. Kozintsev, San Jose, CA (US); Minerva M. Yeung, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 1118 days.

(21) Appl. No.: 09/945,422

(22) Filed: Aug. 31, 2001

(65) Prior Publication Data

US 2003/0046559 A1    Mar. 6, 2003

(51) Int. Cl.
*G06F 9/345* (2006.01)
(52) U.S. Cl. .................. 711/206; 711/207; 711/221; 711/150; 711/104

(58) Field of Classification Search .................. None
See application file for complete search history.

*Primary Examiner*—B. James Peikari
(74) *Attorney, Agent, or Firm*—Blakely, Sokoloff, Taylor & Zafman LLP

(57) ABSTRACT

An apparatus and method for loading a data storage device with a plurality of randomly located data are described. The method includes loading, in response to execution of a multiple data load instruction, data within a destination data storage device wherein one or more data elements from the data are randomly located within a memory device. In one embodiment, addresses of the data elements are contained within a data storage device and indicated as index addresses. In addition, the data elements are stored n one or more data storage areas of a memory device, which include look-up tables, data arrays or the like. In addition, data elements within the destination data storage device, as well as address indexes within the address data storage device may be organized in response to execution of a data shuffle instruction according to a data processing operation instruction.

28 Claims, 18 Drawing Sheets

| 127 | 120 119 | 112 111 | 104 103 | | 24 23 | 16 15 | 8 7 | 0 |
|---|---|---|---|---|---|---|---|---|
| bbbb bbbb | bbbb bbbb | bbbb bbbb | • • • | bbbb bbbb | bbbb bbbb | bbbb bbbb |

UNSIGNED PACKED BYTE IN-REGISTER REPRESENTATION 286

| 127 | 120 119 | 112 111 | 104 103 | | 24 23 | 16 15 | 8 7 | 0 |
|---|---|---|---|---|---|---|---|---|
| sbbb bbbb | sbbb bbbb | sbbb bbbb | • • • | sbbb bbbb | sbbb bbbb | sbbb bbbb |

SIGNED PACKED BYTE IN-REGISTER REPRESENTATION 288

FIG. 5A

| 127 | 112 111 | | 16 15 | 0 |
|---|---|---|---|---|
| wwww wwww wwww wwwww | | ● ● ● | | wwww wwww wwww wwwww |

UNSIGNED PACKED WORD IN-REGISTER REPRESENTATION 290

| 127 | 112 111 | | 16 15 | 0 |
|---|---|---|---|---|
| swww wwww wwww wwwww | | ● ● ● | | swww wwww wwww wwwww |

SIGNED PACKED WORD IN-REGISTER REPRESENTATION 292

FIG. 5B

| 127 | 96 95 | | 32 31 | 0 |
|---|---|---|---|---|
| dddd dddd dddd dddd dddd dddd dddd dddd | | ● ● ● | | dddd dddd dddd dddd dddd dddd dddd dddd |

UNSIGNED DOUBLEWORD IN-REGISTER REPRESENTATION 294

| 127 | 96 95 | | 32 31 | 0 |
|---|---|---|---|---|
| sddd dddd dddd dddd dddd dddd dddd dddd | | ● ● ● | | sddd dddd dddd dddd dddd dddd dddd dddd |

SIGNED DOUBLEWORD IN-REGISTER REPRESENTATION 296

FIG. 5C

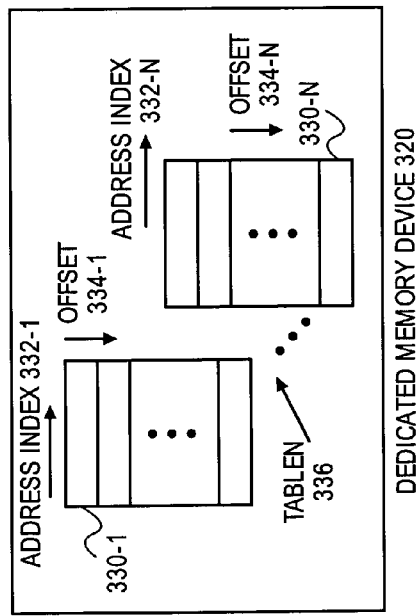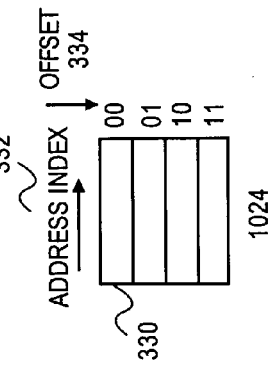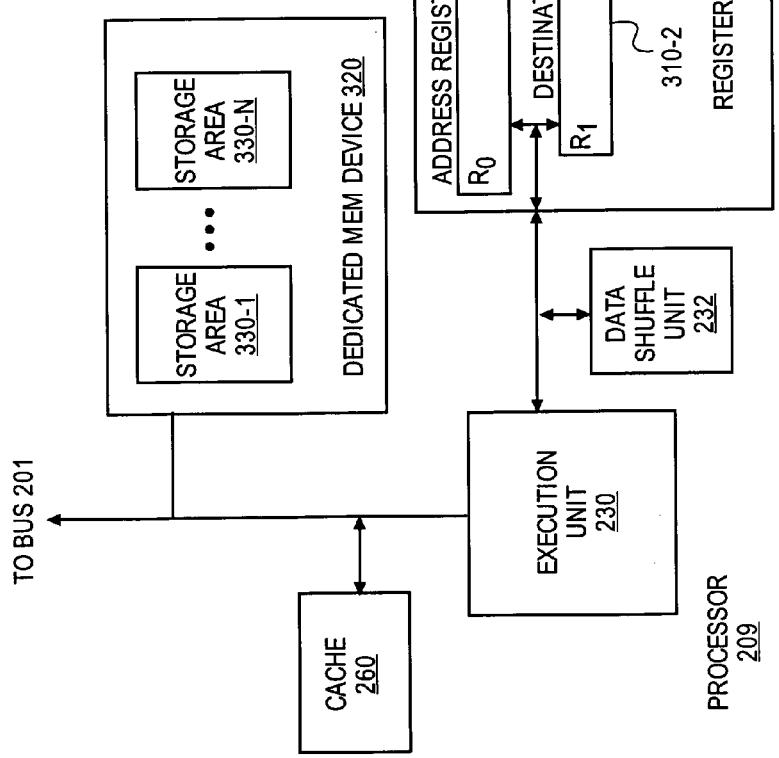

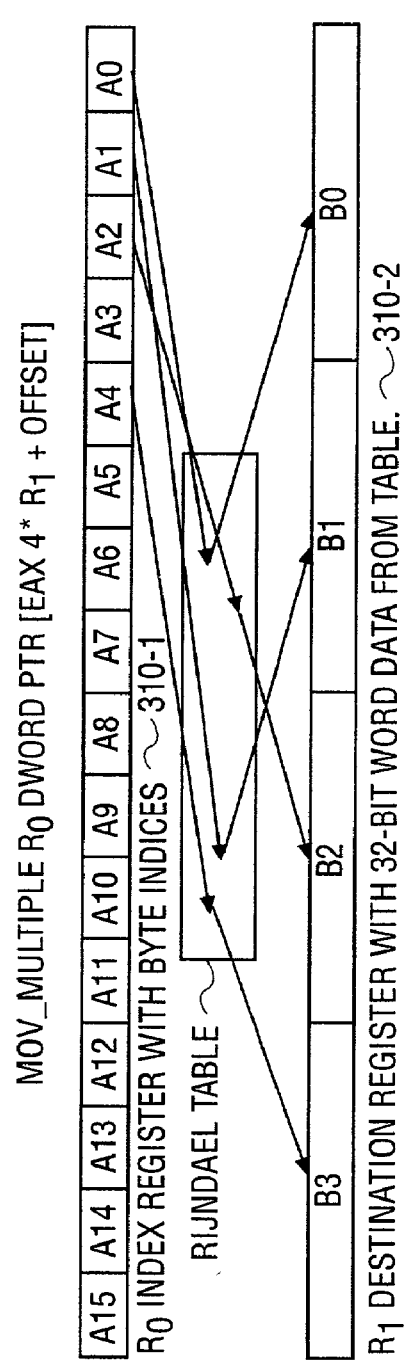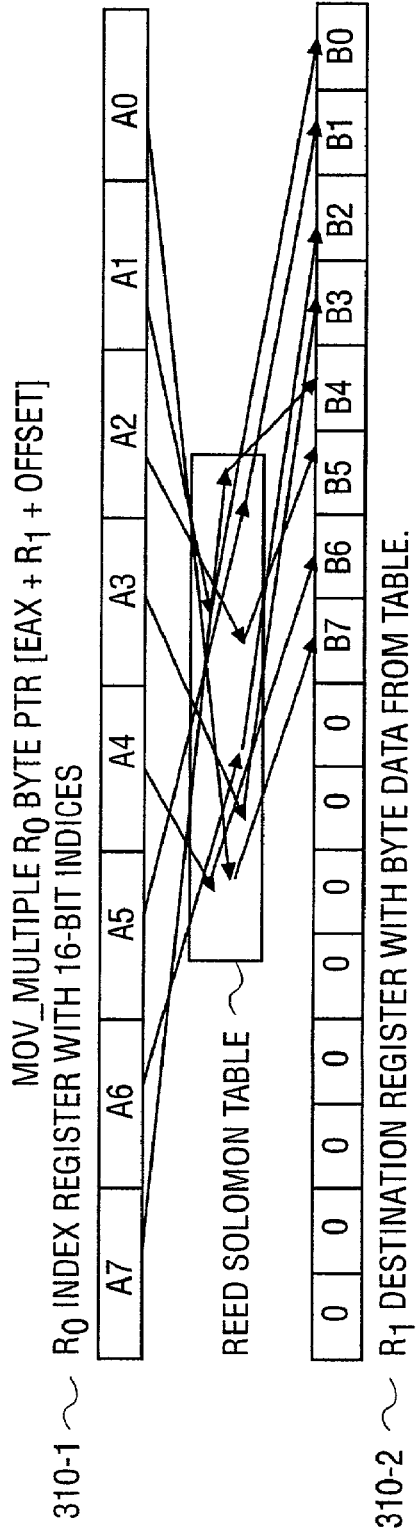
FIG. 8
FIG. 9

APPARATUS AND METHOD FOR A DATA STORAGE DEVICE WITH A PLURALITY OF RANDOMLY LOCATED DATA

FIELD OF THE INVENTION

The present invention relates generally to the fields of encryption and communications algorithms. More particularly, the invention relates to an apparatus and method for a data storage device with a plurality of randomly located data.

BACKGROUND OF THE INVENTION

Media applications have been driving microprocessor development for more than a decade. In fact, most computing upgrades in recent years have been driven by media applications, predominantly within the computer segments, but also in enterprise segments for entertainment-enhanced education and communication purposes. Nevertheless, future media applications will require even higher computational requirements. As a result, tomorrow's personal computer (PC) will be even richer in audio-visual effects, as well as being easier to use and more importantly, computing will merge with communications.

Accordingly, the display of images as well as playback of audio and video have become increasingly popular applications for current computing devices. However, protection of such content becomes increasingly important as such current computing devices emerge. For example, encryption algorithms are commonly used to protect the integrity of transmitted content while error control algorithms are utilized to recapture content in the event of lost or corrupted data during transmission. Unfortunately, a very significant number of multi-media, as well as communications and encryption algorithms, utilize look-up tables.

As known to those skilled in the art, look-up tables store results of computationally-intensive operations that are calculated before an application starts or when an application is initialized. In addition, some applications access data within the look-up tables in a random pattern. Consequently, it is often difficult to exploit any data level parallelism utilizing, for example, single instruction multiple data (SIMD) instructions. This is due to the fact that current instructions have no efficient way for loading a register, in response to execution of a single instruction, with data that is stored within randomly located addresses.

Referring now to FIG. 1, FIG. 1 illustrates this data load problem. As depicted in FIG. 1, values in a data storage area (T) 102 cannot be loaded into a data storage device 120, such as a register, utilizing a single instruction if the indices of A, B, C and D are offsets for data that is not contiguous in memory. Current algorithms that utilize look-up tables must generate an address before accessing the data storage area 102 in order to store T[A] 104, T[B] 110, T[C] 106 and T[D] 108. For example, in a 32-bit approach, one of the 4 bytes in a 32-byte word is used to access data from a table with 256 values. Some implementations generate a look-up table address by accessing the targeted byte from memory, while other implementations extract the targeted byte from the 32 bit word.

Encryption and channel codes are examples of common operations that use utilize look-up tables. The Rijndael algorithm which was recently selected as the standard by the Advanced Encryption Standard (AES), while a very popular channel code is the Reed Solomon, forward error correction code. As known to those skilled in the art, forward error control adds data to a network packet to correct transmission errors in lost packets, which is vital within wireless networks. Rijndael encryption and Reed Solomon forward error control employ methods that access data from look-up tables in a random address pattern. Both of these algorithms have data level parallelism that can be more effectively exploited with an efficient method of loading a data storage device from random locations in memory.

In fact, in both Rijndael encryption and forward error control (FEC), implemented with Reed Solomon erasure codes, finite field multiply-accumulate is one of the most common operations and occupies the majority of the computational capacity. As a result, significant improvement is available in architecture designs by improving the performance of such operations. In fact, memory access will be a performance bottleneck in future processors. As a result, the inability to load randomly distributed data leads to a significant increase in the number of clock cycles required to execute communication as well as encryption algorithms. In addition, power required to execute such algorithms is approximately proportional to the number of clocks. As such, power loss presents a significant problem in conventional systems.

Therefore, there remains a need to overcome one or more of the limitations in the above-described, existing art.

BRIEF DESCRIPTION OF THE DRAWINGS

The present invention is illustrated by way of example, and not by way of limitation, in the figures of the accompanying drawings and in which:

FIG. 5A illustrates an in-register packed byte representation according to one embodiment of the present invention.

FIG. 5B illustrates an in-register packed word representation according to one embodiment of the present invention.

FIG. 5C illustrates an in-register packed doubleword representation according to one embodiment of the present invention.

FIGS. 6A, 6B and 6C depict block diagrams illustrating the processor as depicted in FIG. 3 in accordance with a further embodiment of the present invention.

FIG. 8 depicts a block diagram further illustrating a multiple data load operation in accordance with a further embodiment of the present invention.

FIG. 9 depicts a block diagram further illustrating a multiple data load operation in accordance with a further embodiment of the present invention.

DETAILED DESCRIPTION

Figure 1:
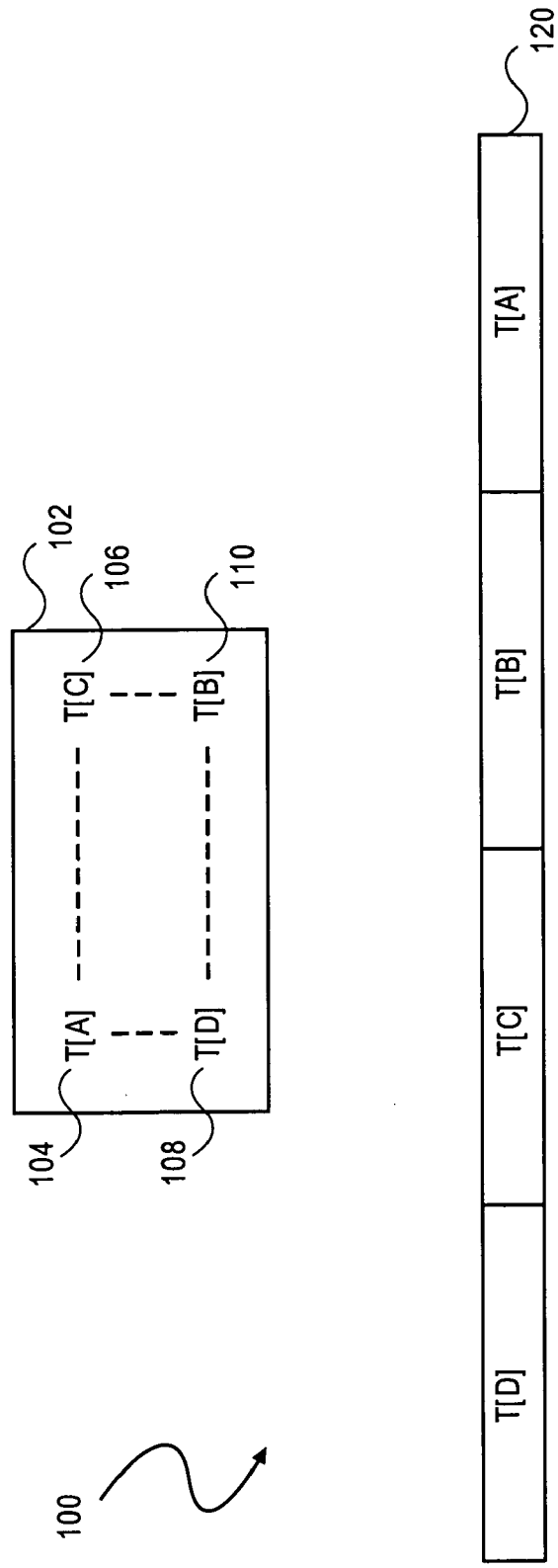
FIG. 1 depicts a block diagram illustrating the inability of conventional computing architectures to load randomly distributed data within a destination data storage device.

A method and apparatus for loading a data storage device with a plurality of randomly located data are described. The method includes loading, in response to execution of a multiple data load instruction, data within a destination data storage device wherein one or more data elements from the data are randomly located within a memory device. As described herein, the term "randomly located/distributed data" refers to data with addresses that may be non-contiguous and have no definite pattern within memory.

In one embodiment, addresses of the data elements are contained within a data storage device and indicated as index addresses. In addition, the data elements are stored in one or more data storage areas of a memory device, which include look-up tables, data arrays or the like. In addition, data elements within the destination data storage device, as well as address indexes within the address data storage device may be organized in response to execution of a data shuffle instruction according to a data processing operation instruction.

In the following description, for the purposes of explanation, numerous specific details are set forth in order to provide a thorough understanding of the present invention. It will be apparent, however, to one skilled in the art that the present invention may be practiced without some of these specific details. In addition, the following description provides examples, and the accompanying drawings show various examples for the purposes of illustration. However, these examples should not be construed in a limiting sense as they are merely intended to provide examples of the present invention rather than to provide an exhaustive list of all possible implementations of the present invention. In other instances, well-known structures and devices are shown in block diagram form in order to avoid obscuring the details of the present invention.

In an embodiment, the methods of the present invention are embodied in machine-executable instructions. The instructions can be used to cause a general-purpose or special-purpose processor that is programmed with the instructions to perform the steps of the present invention. Alternatively, the steps of the present invention might be performed by specific hardware components that contain hardwired logic for performing the steps, or by any combination of programmed computer components and custom hardware components.

The present invention may be provided as a computer program product which may include a machine or computer-readable media having stored thereon instructions which may be used to program a computer (or other electronic devices) to perform a process according to the present invention. The computer-readable medium may include, but is not limited to, floppy diskettes, optical disks, Compact Disc, Read-Only Memory (CD-ROMs), and magneto-optical disks, Read-Only Memory (ROMs), Random Access Memory (RAMs), Erasable Programmable Read-Only Memory (EPROMs), Electrically Erasable Programmable Read-Only Memory (EEPROMs), magnetic or optical cards, flash memory, or the like.

Accordingly, the computer-readable medium includes any type of media/machine-readable medium suitable for storing electronic instructions. Moreover, the present invention may also be downloaded as a computer program product. As such, the program may be transferred from a remote computer (e.g., a server) to a requesting computer (e.g., a client). The transfer of the program may be by way of data signals embodied in a carrier wave or other propagation medium via a communication link (e.g., a modem, network connection or the like).

Computing Architecture

Figure 2:
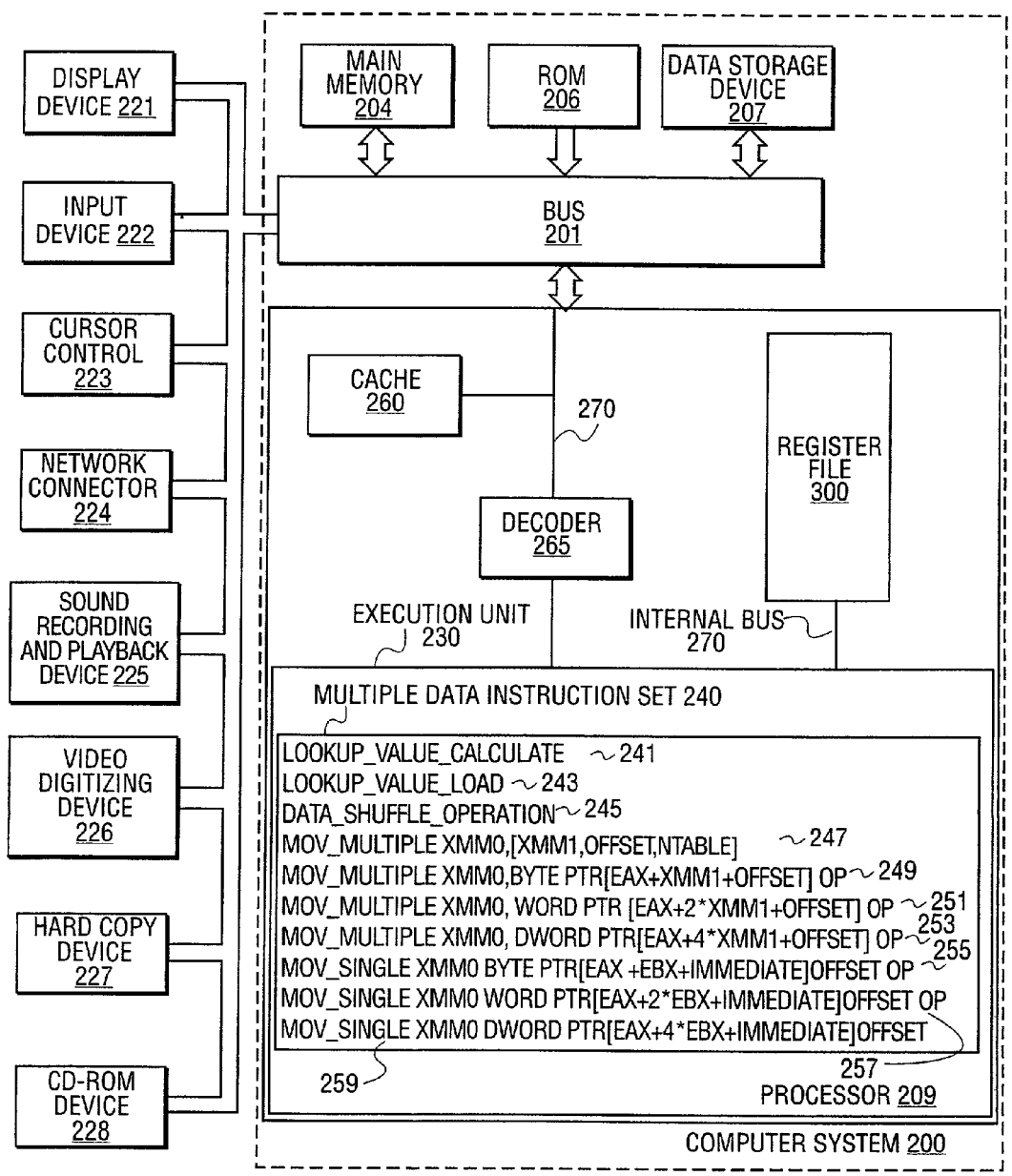
FIG. 2 depicts a block diagram illustrating a computer system capable of implementing one embodiment of the present invention.

FIG. 2 shows a computer system 200 upon which one embodiment of the present invention can be implemented. Computer system 200 comprises a bus 201 for communicating information, and a processor 209 coupled to the bus 201 for processing information. The computer system 200 also includes a memory subsystem 204–207 coupled to the bus 201 for storing information and instructions for the processor 209.

The processor 209 includes an execution unit 230, a register file 300, a cache memory 260, a decoder 265, and an internal bus 270. Cache memory 260 is coupled to the execution unit 230 and stores frequently and/or recently used information for the processor 209. Register file 300 stores information in the processor 209 and is coupled to the execution unit 230 via the internal bus 270. In one embodiment of the invention, register file 300 includes multimedia registers for storing multimedia information.

In one embodiment, the multimedia registers each store up to one hundred twenty-eight bits of packed data. Multimedia registers may be dedicated multimedia registers or registers which are used for storing multimedia information and other information. In one embodiment, multimedia registers store multimedia data when performing multimedia operations and store floating point data when performing floating point operations.

Execution unit 230 operates on packed data, according to the instructions received by processor 209 that are included in multiple-data instruction set 240. Execution unit 230 also operates on scalar data according to instructions implemented in general-purpose processors. Processor 209 is capable of supporting the Pentium® microprocessor instruction set and the multiple-data instruction set 240. By including packed instruction set 240 in a standard microprocessor instruction set, such as the Pentium ® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER and MOTOROLA. Alpha™ is a trademark of Digital Equipment Corporation.)

In one embodiment, the multiple-data instruction set 240 includes instructions (as described in further detail below) for a look-up value calculate operation 241, a look-up value load operation 243, a data shuffle operation 245, multiple move operations 247–253 and single move operations 255–259. Move multiple operations (MOV_MULTIPLE OP) 247 enables movement of multiple randomly distributed data elements within a memory device for storage within a destination storage device.

Figure 3:
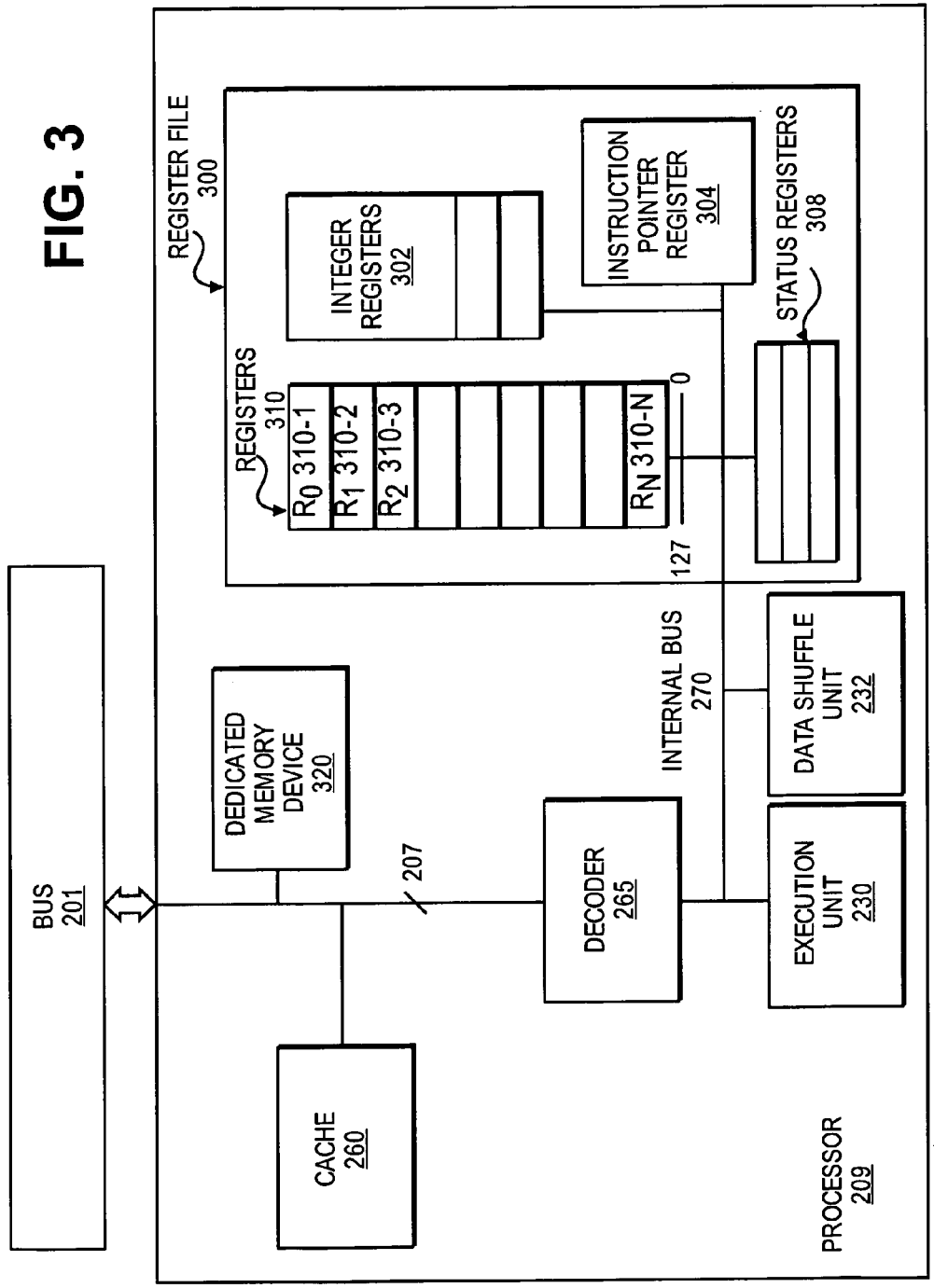
FIG. 3 depicts a block diagram illustrating an embodiment of the processor as depicted in FIG. 2 in accordance with a further embodiment of the present invention.

The MOV_MULTIPLE operation 247 is utilized for computing architectures which may include a dedicated memory device which may include look-up tables, or arrays, which store computationally intensive operations which are calculated at application initialization or at application start up. MOV_MULTIPLE OPS 249–253 are utilized to load multiple randomly distributed data within standard memory devices, such as cache memory 260 as depicted in FIGS. 2 and 3. Finally, MOV SINGLE OPS 255–259 enable the load of randomly distributed data within an address position of a destination data storage device.

By including the multiple-data instruction set 240 in the instruction set of the general-purpose processor 209, along with associated circuitry to execute the instructions, the operations used by many existing multimedia applications may be performed using packed data in a general-purpose processor. Thus, many multimedia applications, as well as performance of encryption and channel code operations, may be accelerated and executed more efficiently by using the full width of a processor's data bus for performing operations on packed data. This eliminates the need to transfer smaller units of data across the processor's data bus to perform one or more operations one data element at a time. In addition, data level parallelism is efficiently exploited when performing encryption and channel operations.

Still referring to FIG. 2, the computer system 200 of the present invention may include a display device 221 such as a monitor. The display device 221 may include an intermediate device such as a frame buffer. The computer system 200 also includes an input device 222 such as a keyboard, and a cursor control 223 such as a mouse, or trackball, or trackpad. The display device 221, the input device 222, and the cursor control 223 are coupled to bus 201. Computer system 200 may also include a network connector 224 such that computer system 200 is part of a local area network (LAN) or a wide area network (WAN).

Additionally, computer system 200 can be coupled to a device for sound recording, and/or playback 225, such as an audio digitizer coupled to a microphone for recording voice input for speech recognition. Computer system 200 may also include a video digitizing device 226 that can be used to capture video images, a hard copy device 227 such as a printer, and a CD-ROM device 228. The devices 224–228 are also coupled to bus 201. In addition, receipt and transmission content data (image, audio, video and speech data) may be encrypted in order to avoid public exposure of the data an encoded in order to recover lost or corrupted content.

Processor

FIG. 3 illustrates a detailed diagram of processor 209. Processor 209 can be implemented on one or more substrates using any of a number of process technologies, such as, BiCMOS, CMOS, and NMOS. Processor 209 comprises a decoder 265 for decoding control signals and data used by processor 209. Data can then be stored in register file 300 via internal bus 270. As a matter of clarity, the registers of an embodiment should not be limited in meaning to a particular type of circuit. Rather, a register of an embodiment need only be capable of storing and providing data, and performing the functions described herein.

Depending on the type of data, the data may be stored in integer registers 302, registers 310 (310-1, . . ., 310-N), status registers 308, or instruction pointer register 304. Other registers can be included in the register file 300, for example, floating point registers. In one embodiment, integer registers 302 store thirty-two bit integer data. In one embodiment, registers 310 contain one or more multimedia registers, $R_0$ 310-1 through $R_N$ 310-N. Each register in registers 310 is one hundred twenty-eight bits in length. $R_0$ 310-1 $R_1$ 310-2, and $R_2$ 310-N are examples of individual registers in registers 310. Thirty-two bits of a register in registers 310 can be moved into an integer register in integer registers 202. Similarly, an value in an integer register can be moved into thirty-two bits of a register in registers 310.

Status registers 308 indicate the status of processor 209. Instruction pointer register 211 stores the address of the next instruction to be executed. In addition, integer registers 302, registers 310, status registers 308, and instruction pointer register 304 all connect to internal bus 270. Any additional registers would also connect to the internal bus 270.

In another embodiment, some of these registers can be used for two different types of data. For example, registers 310 and integer registers 302 can be combined, where each register can store either integer data or packed data. In another embodiment, registers 310 can be used as floating point registers. In this embodiment, packed data can be stored in registers 310 or floating point data. In one embodiment, the combined registers are one hundred twenty-eight bits in length and integers are represented as one hundred twenty-eight bits. In this embodiment, in storing packed data and integer data, the registers do not need to differentiate between the two data types.

Execution unit 230 may include one or more function units to performs the operations carried out by processor 209. Such operations may include shifts, addition, subtraction and multiplication, multiply-accumulate, etc. Execution unit 230 connects to internal bus 270. Cache 260 is an optional element of processor 209 and can be used to cache data and/or control signals from, for example, main memory 204. Cache 260 is connected to decoder 265, and is connected to receive control signal 207. However, in contrast to conventional processors, one embodiment of the processor includes a dedicated memory device 320. The dedicated memory device contains computationally intensive operation results that are calculated before an application start-up or at application initialization. Representatively, data shuffle unit 232 may be coupled between register file 300 and execution unit 230. In one embodiment, data shuffle unit 232 organizes, in response to execution of an address shuffle instruction, address elements within the address data storage device 310 according to a data processing operation: and organizes, in response to executing a data shuffle instruction, data elements within destination data storage device 310 according to a data processing operation.

Data and Storage Formats

Figure 4:
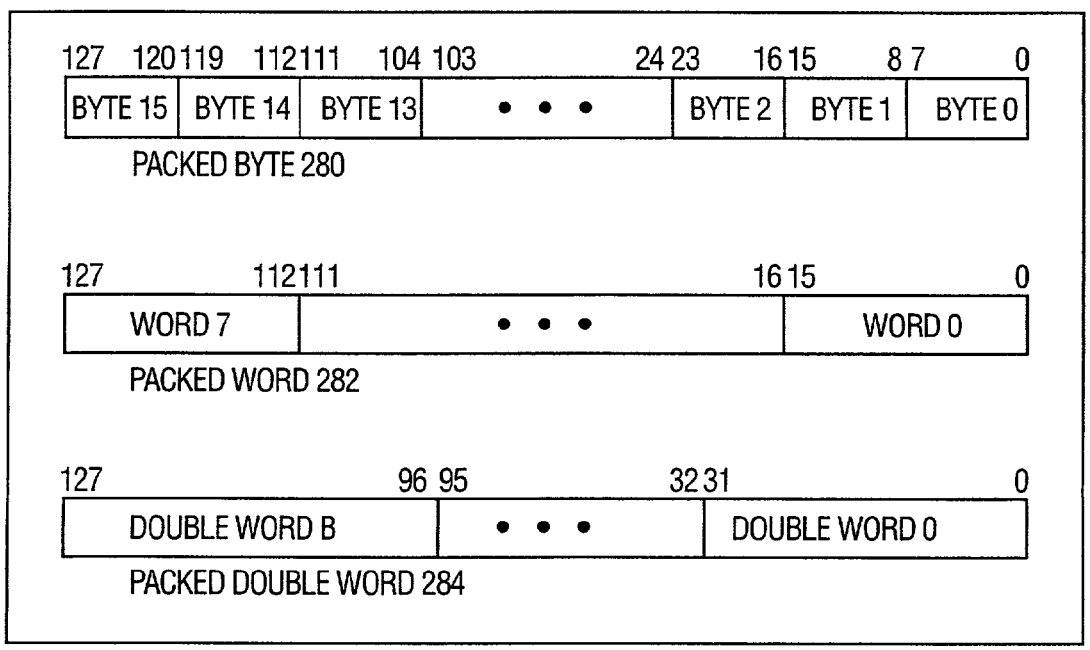
FIG. 4 depicts a block diagram illustrating packed data types according to an embodiment of the present invention.

FIG. 4 illustrates three packed data-types: packed byte 280, packed word 282, and packed doubleword (dword) 284. Packed byte 280 is one hundred twenty-eight bits long containing sixteen packed byte data elements. Generally, a data element is an individual piece of data that is stored in a single register (or memory location) with other data elements of the same length. In packed data sequences, the number of data elements stored in a register is one hundred twenty-eight bits divided by the length in bits of a data element.

Packed word 282 is one hundred twenty-eight bits long and contains eight packed word data elements. Each packed word contains sixteen bits of information. Packed doubleword 284 is one hundred twenty-eight bits long and contains four packed doubleword data elements. Each packed doubleword data element contains thirty-two bits of information. A packed quadword is one hundred twenty-eight bits long and contains two packed quad-word data elements.

FIGS. 5A–5C illustrate the in-register packed data storage representation according to one embodiment of the invention. Unsigned packed byte in-register representation 286 illustrates the storage of an unsigned packed byte 280 in one of the multimedia registers 310, as shown in FIG. 5A. Information for each byte data element is stored in bit seven through bit zero for byte zero, bit fifteen through bit eight for byte one, and up to bit one hundred twenty through bit one hundred twenty-seven for byte fifteen. Thus, all available bits are used in the register. This storage arrangement increases the storage efficiency of the processor. As well, with sixteen data elements accessed, one operation can now be performed on sixteen data elements simultaneously. Signed packed byte in-register representation 288 illustrates the storage of a signed packed byte 280. Note that the eighth bit of every byte data element is the sign indicator.

Unsigned packed word in-register representation 290 illustrates how word seven through word eight are stored in a register of multimedia registers 310, as illustrated in FIG. 5B. Signed packed word in-register representation 292 is similar to the unsigned packed word in-register representation 290. Note that the sixteenth bit of each word data element is the sign indicator. Unsigned packed doubleword in-register representation 294 shows how multi-media registers 209 store two doubleword data elements, as illustrated in FIG. 5C. Signed packed doubleword in-register representation 296 is similar to unsigned packed doubleword in-register representation 294. Note that the necessary sign bit is the thirty-second bit of the doubleword data element.

Referring now to FIG. 6A, FIG. 6A further illustrates the processor 209 as initially depicted in FIGS. 2 and 3 in order to illustrate the dedicated MEM device 320, as well as the register file 300. Accordingly, in the embodiment described, the computer system 200 includes a dedicated memory device 320 for storing computationally intensive operations that are calculated before application start-up or when an application is initialized. Such computationally intensive operations are utilized by encryption as well as channel code operations as described above, which may be stored in data arrays, look-up tables, storage areas or the like within the dedicated MEM device 320. Alternatively, the computationally intensive operations may be stored in cache memory 260.

In contrast to conventional data access methods, which include a capability to load one or multiple bytes of data that are stored in a contiguous memory space, the processor 209 as depicted in FIGS. 6A includes multiple-data instruction set 240. The multiple-data operation set enables loading of data within destination register $R_1$ 310-2, that is initially randomly distributed within storage areas 330 (330-1, ..., 330-N) of the dedicated memory device 320. Accordingly, once computationally intensive operations are stored within storage areas 330, an application utilizing or requiring the computational results loads the desired results within a destination register 310-2 based on, for example, address indexes which are stored in address register ($R_0$) 310-1.

In one embodiment, execution unit 230 receives an address index, as well as other information to access data elements stored within the storage areas 330 and stores those requested data elements within the destination register 310-1. Representatively, data shuffle unit 232 is coupled between register file 300 and the execution unit. In one embodiment, data shuffle unit 232 organizes, in response to execution of an address shuffle instruction, address elements within the address data storage device 310 according to a data processing operation and organizes, in response to executing a data shuffle instruction, data elements within destination data storage device 310-2 according to a data processing operation.

In one embodiment, a multiple move operation: MOV_MULTIPLE $R_0$, [$R_1$, offset, tableN] directs the loading of multiple, randomly distributed data from the dedicated memory device 320 as depicted in FIGS. 6B and 6G. Accordingly, the $R_0$ argument indicates the address register 310-1 which contains address indexes for capturing data within the storage areas 330, which in one embodiment are configured as look-up tables. The $R_1$ argument indicates the destination register 310-2 wherein to store the data elements which are read from the storage areas 330 of the memory device 320. The offset argument indicates an area 334 (334-1, ..., 334-N) within which the look-up table 330 has been divided. Finally, the tableN argument 336 indicates the table 330 within the memory device 320 which contains the data. For example, FIG. 6C depicts a 1024 byte table 330 with a 256-byte address index 332 and a two bit offset 334.

Figure 7:
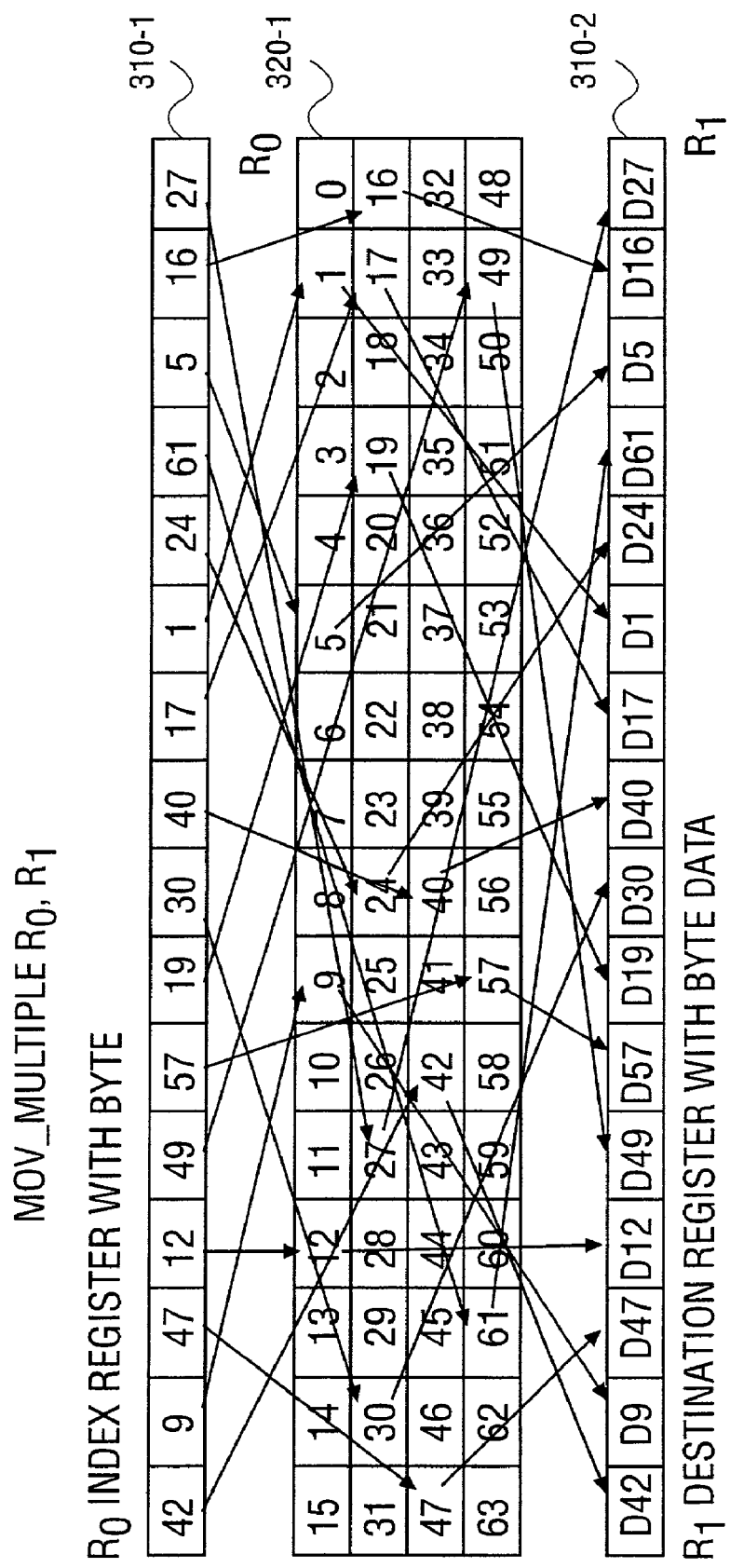
FIG. 7 depicts a block diagram illustrating a multiple data load operation of randomly distributed data within a memory device and stored within a destination data storage device in accordance with one embodiment of the present invention.

Loading of multiple randomly distributed data is further illustrated with reference to FIG. 7. Referring to FIG. 7, FIG. 7 depicts the $R_0$ address register 310-1, which is indexed with byte address indexes. Accordingly, the execution unit 230 will select an address index from the $R_0$ register 310-1 and store a data element read from the address index within the $R_1$ destination register 310-2. In one embodiment, both the $R_0$ address register 310 and the destination register 310-2 are, for example, Intel® MMX one hundred twenty-eight bit registers. Accordingly, in response to execution of multiple data load instruction, the present invention teaches the ability to load multiple randomly distributed data from look-up table 320 to the destination data storage device 310.

Referring again to FIG. 7, data is stored in a dedicated look-up table 320 and is addressed by indices that are stored in an address register 310-1. In addition, in the embodiment described, data is accessed as bytes, such that an index is required for each byte. However, in further embodiments, support for larger data types is implemented by maintaining the relative position of bytes within a larger data type during load operations. This is accomplished by various appropriate choices of indices, as described in further detail below. For example, if the size of the look-up table is greater than 256 bytes, or there are more than one table, an additional offset or table number, must be added (end table).

As such, the number of bits required to identify a 256 region of a table is equal to the square root of the number of table regions. For example, a 1,024 byte table has four 256 byte regions and therefore requires 2 bytes to specify a region, as depicted in FIG. 6C. Also, the number of bits required to identify a table (tableN 336) is equal to the square root of the number of tables which yields the instruction format for MOV_MULTIPLE as provided above. For example, the number 515 in a 1,024 byte table has an index value of 3 stored in R1 address register 310-1 and 2 corresponding offset bits 10.

However, loading multiple randomly distributed data within a conventional cache or memory requires a base address. Examples of assembly language mnemonics for instructions with multiple indices are provided below:

MOV_MULTIPLE xmm0, BYTE PTR[eax+xmm1+offset]

MOV_MULTIPLE xmm0, WORD PTR[eax+2*xmm1+offset]

MOV_MULTIPLE xmm0, DWORD PTR[eax+4*xmm1+offset].

The assembly language mnemonics are similar to memory access instructions within traditional computing architectures. However, the assembly language mnemonics utilize, for example, a single instruction multiple data (SIMD) register as an address index for locating data elements within look-up tables, arrays or the like contained within the memory devices.

Accordingly, in the assembly language mnemonics provided, MOV_MULTIPLE indicates the type of instruction, xmm1($R_1$) is the destination data storage device within which to store multiple randomly located data elements. BYTE PTR, WORD PTR and DWORD PTR are memory access data types of the data elements. In addition the EAX argument stores the base address of the storage area, such as a table or array, while the xmm0($R_0$) argument refers to an address register that stores multiple address indices of data to be addressed.

Finally, the offset argument is an immediate offset relative to the base address contained in the EAX argument. Factors 2* and 4* indicate a multiply value and specify the amount index values are multiplied for a particular memory access data type. The data type of the indices stored in the index register is also specified. In one embodiment, this is provided with the instruction name given, which in the example is MOV_MULTIPLE. The data type or size of the indices specifies the range of values that can be accessed for a given base address and immediate offset.

However, in alternative embodiments, the data and index data types are not required to be the same. As such, it is not necessary for the data types of the indices and the access data to be the same. However, some of the indices in an index register are not used if the memory access data type is larger than the indexed data type. In addition, a destination register cannot be filled if the memory access data type is smaller than the indexed data type.

Referring now to FIGS. 8 and 9, FIG. 8 depicts a block diagram illustrating an embodiment in which the memory access data type is a 32-bit word and the index data type is a byte. Accordingly, the destination register $R_1$ 310-2 is quickly filled with only four of the address indexes contained in the $R_0$ address register 310-1. As known to those skilled in the art, such a data load operation is common in encryption algorithms such as the Rijndael algorithm, as described above.

Referring now to FIG. 9, FIG. 9 depicts a block diagram illustrating an embodiment wherein the address index data type is a 16-bit word, while the memory access data type is a byte. As such, loading of the multiple randomly distributed data does not completely fill the $R_1$ destination register 310-2, even following loading of each address index from the $R_0$ address register 310-1. As recognized by those skilled in the art, the embodiment described with reference to FIG. 9 occurs in forward error control algorithms which utilize Reed Solomon codes. In each case, the position of the index gives the position of the accessed data within the destination register.

In the embodiments described, indices used for accessing data are stored into the base of the register. In an alternate embodiment, indices are identified by using an operand in the instruction that specifies the offset from the beginning of the index register of the first index that is used for accessing data. However, as depicted in FIG. 9, an alternate solution for selecting the position for loading data in the destination register uses an operand in the instruction to specify the offset from the base of the destination register. Accordingly, as depicted in FIG. 8, data elements with a 32-bit word data type that are indexed with byte address indexes may utilize multiple destination registers in order to store the entire data. In addition, in the embodiment depicted in FIG. 9, smaller index address registers may be utilized in order to load byte data that fills the entire destination data storage device.

In an alternate embodiment for storing data that is accessed by a multiple data load instruction within a traditional cache, it is desirable to lock cache lines that are to store the data so that the load does not block if requested data has been evicted. As such, in one embodiment, a method for preventing eviction in an n-way associative cache, modifies the eviction policy so that the specified cache lines are not considered for eviction. In this embodiment, when used to lock cache lines, additional instructions are needed to lock part of the cache so that data loads will not evict table data.

In the embodiment described, an instruction is provided which modifies the eviction policy so that lines (containing look-up table data) are not considered for eviction. A special load instruction is used to specify that data should not be loaded in a protected cache line and that the index of the set where the data is stored should not be considered for eviction. Accordingly, a contrary instruction is then used to free individual cache lines by specifying the address or cache line if no address is specified. In one embodiment, the instructions are as follows:

LOCK_CACHE [eax];
UNLOCK_CACHE [eax]; and
UNLOCK_CACHE_ALL.

In the described instructions, eax is a register that holds the address of the cache line that is locked. Those skilled in the art will appreciate that other details such as the load instruction (described above) as well as these lock instructions may require placement in a critical section of the computer program so that another thread does not load data into the address contained within the eax. In one embodiment, cache line locking may be performed using conventional instruction or techniques as known in the art.

Figure 10:
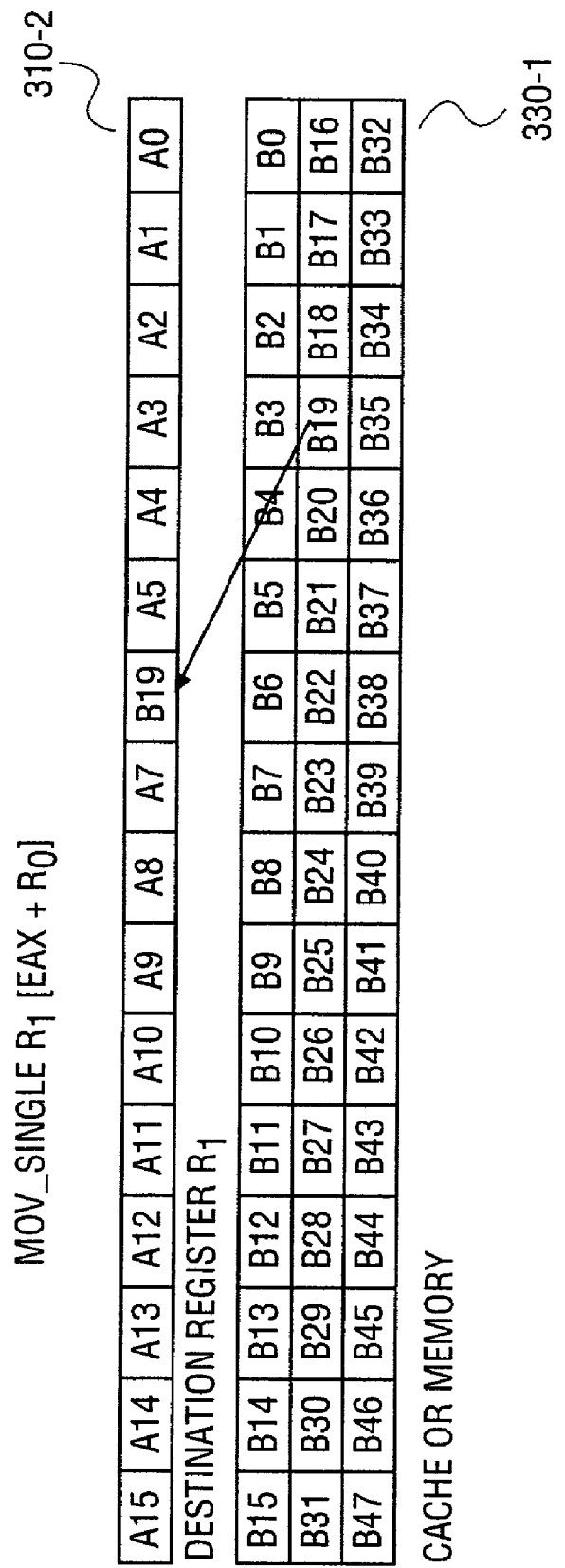
FIG. 10 depicts a block diagram illustrating a single data load operation in accordance with an embodiment of the present invention.

Referring to FIG. 10, FIG. 10 depicts a block diagram illustrating an embodiment where data within a look-up table 310 is stored within a destination register $R_1$ 310 at an address position within the destination data storage device 310. Accordingly, the present invention describes a move single operation for loading data in any position within the $R_1$ destination register 310 in response to execution of a single instruction. An instruction for loading a single data item into a location within a multiple data register R$_1$ 310 is provided by utilizing the following assembly language mnemonics for the instructions:

movsingle R$_1$, BYTE PTR[eax+ebx+immediate], offset movsingle R$_1$, WORD PTR[eax+2*ebx+immediate], offset movsing R$_1$, DWORD PTR[eax+4*ebx+immediate], offset The format is similar to the MOV_MULTIPLE assembly language mnemonic with the exception that the offset argument indicates an address position within the destination data storage device. In one embodiment, R1 represents a destination register where data is loaded, while eax represents an address base register which stores the base address. In addition, ebx is an index register that may hold a value to be multiplied by a number, such as 2 or 4, and added to the base address. In one embodiment, immediate is yet another number that is hard coded in the computer program and is added to the base address. An example of the total address, using the described instructions, is [eax+ebx+immediate]. Finally, offset is a value that may be in a register or hard coded that indicates the position in the register in which data is either to be loaded or from which data in the register is to be stored in another storage device, such as a register or memory.

Figure 11:
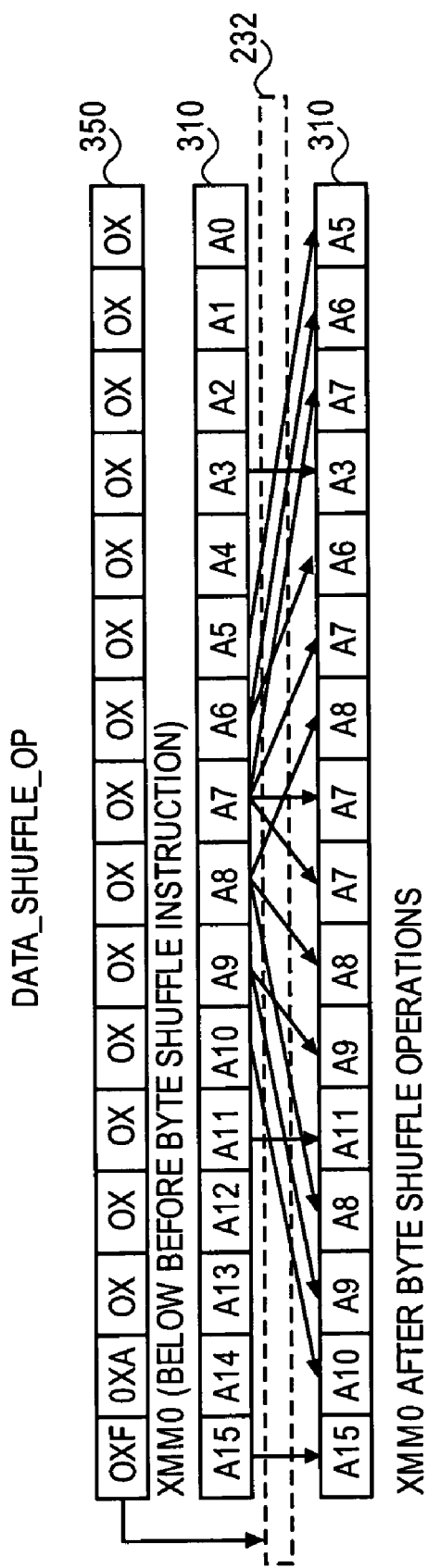
FIG. 11 depicts a block diagram illustrating a data shuffle operation in accordance with an exemplary embodiment of the present invention.

Finally, referring to FIG. 11, FIG. 11 depicts a data shuffle instruction for organizing addresses within an address storage device and data within a destination data storage device. In the embodiment described, data is organized according to a mask 350. Representatively, data shuffle unit 232 (FIGS. 3 and 6A) organizes, in response to execution of an address shuffle instruction, address elements within the address data storage device 310 according to mask 350 or organizes, in response to executing a data shuffle instruction, data elements within the destination data storage device 310 according to mask 350.

The present invention, utilizing the multiple load instruction set as described above, utilizes one conventional load and four non-contiguous loads, which is compared to forty conventional loads in existing methodologies in computing architectures for performing Rijndael implementations. For forward error control implementations, the present invention, using the multiple load instruction set, utilizes two conventional loads, one non-contiguous load and one conventional store instruction, whereas a conventional implementation of forward error control will utilize 48 conventional loads and 16 conventional stores within the conventional computing architectures. Procedural methods for implementing the teachings of the present invention are now described.

Figure 12:
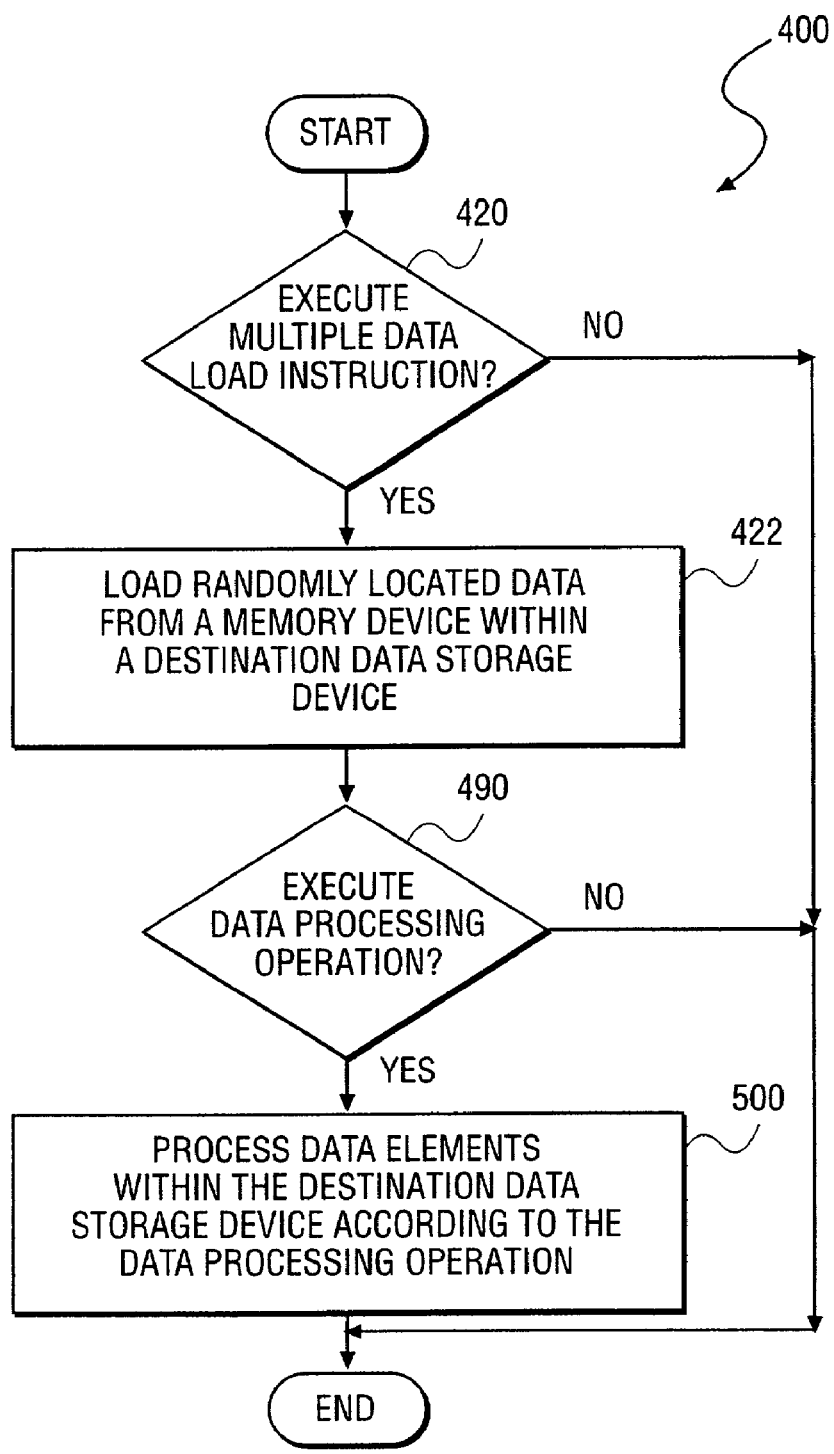
FIG. 12 depicts a flowchart illustrating a method for executing a multiple data load operation in accordance with one embodiment of the present invention.

Referring now to FIG. 12, FIG. 12 depicts a flowchart illustrating a method 400 for performing a multiple data load instruction, for example within the computer system as depicted in FIGS. 2, 3 and 6A–6C in accordance with an embodiment of the present invention. At process block 420, it is determined whether a multiple data load instruction has been executed. In response to execution of a multiple data load instruction, at process block 422, randomly located data from a memory device is loaded within a destination data storage device. Next, a process block 490, it is determined whether a data processing operation has been executed. Finally, at process block 500, in response to execution of a data processing operation, data elements within the destination data storage device are processed according to the data processing operation. Once completed, the method terminates.

Figure 13:
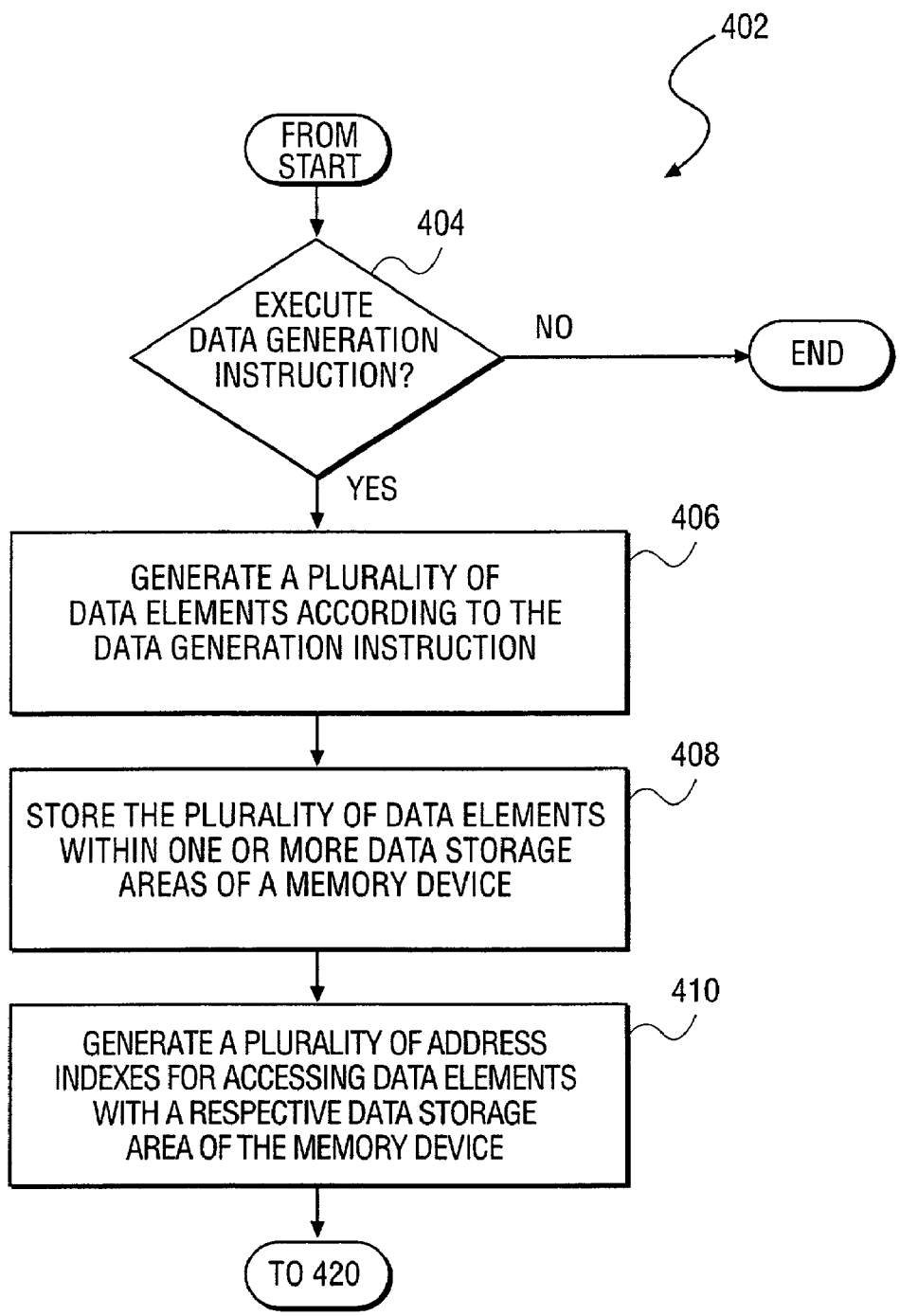
FIG. 13 depicts a flowchart illustrating an additional method for executing a data generation operation in accordance with a further embodiment of the present invention.

Referring now to FIG. 13, FIG. 13 depicts a flowchart illustrating a flowchart 402 for generating computationally intensive operations that are calculated prior to application start-up or during application initialization. Such values are utilized by communications as well as encryption algorithms. At process block 404, it is determined whether a data generation operation has been executed. In response to execution of a data generation instruction, at process block 406, a plurality of data elements are generated according to the data generation instruction.

Next, at process block 408, the plurality of data elements are stored within one or more data storage elements of a memory device, such as for example, look-up tables 310 as depicted in FIGS. 6B and 6C. Finally, at process block 410, a plurality of address indexes for accessing data elements within a respective data storage area of the memory device are generated. Once generated, control flow branches to process block 420, as depicted in FIG. 12.

Figure 14:
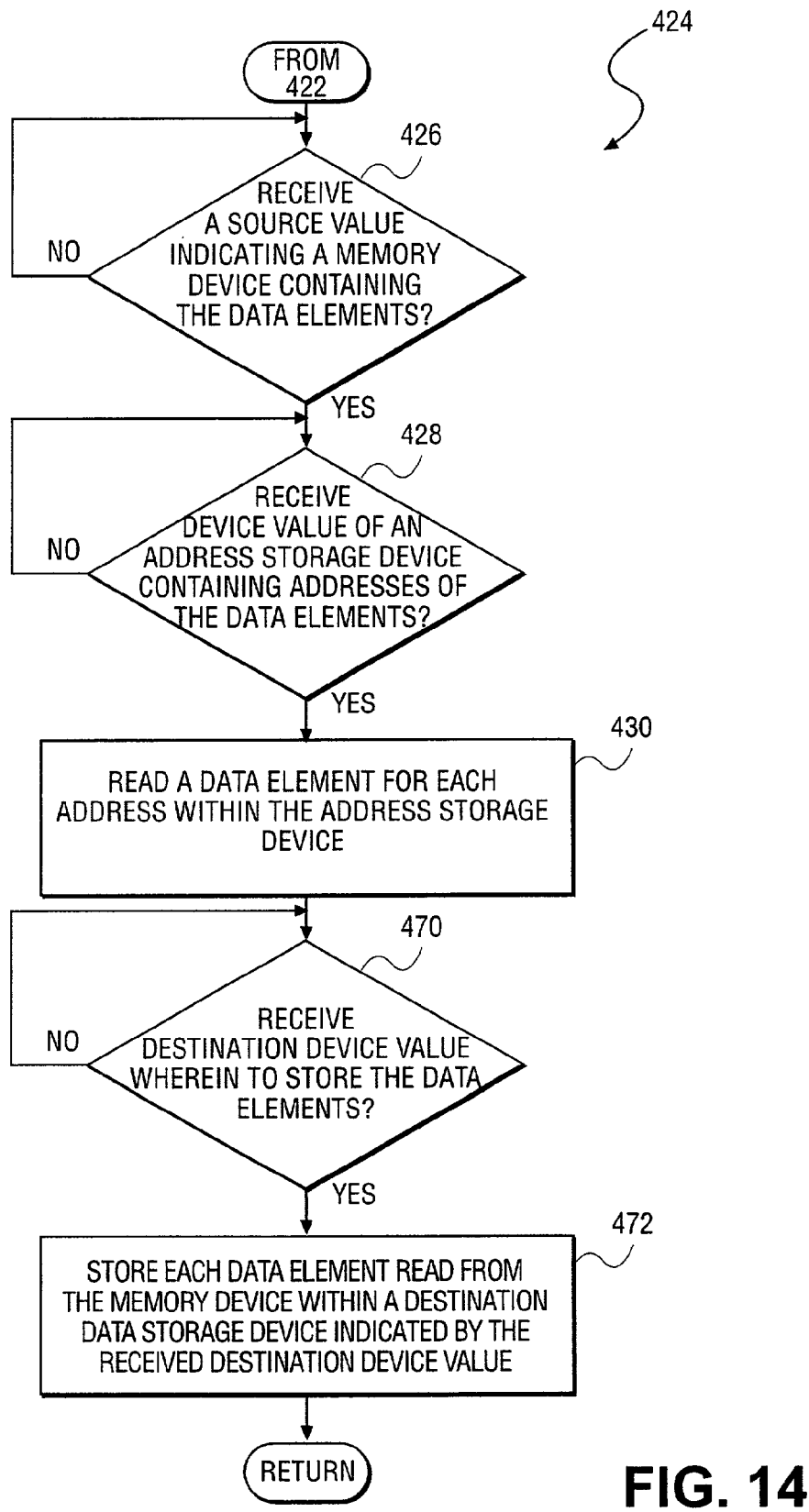
FIG. 14 depicts a flowchart illustrating an additional method for loading randomly distributed data within the data storage device in accordance with a further embodiment of the present invention.

Referring now to FIG. 14, FIG. 14 depicts a flowchart which illustrates an additional method 424 for loading multiple randomly distributed data within the destination data storage device of process block 422, as depicted in FIG. 12. At process block 426, it is determined whether a source value indicating a memory device containing the requested data elements is received.

Once received, at process block 428, it is determined whether a device value of an address storage device, which contains addresses of the requested data elements, is received. Once received, at process block 430, a data element is read for each address contained within the address storage device. Once read, at process block 470, it is determined whether a destination value indicating a destination data storage device wherein to store the data elements is received. Once received, at process block 472, each data element read from the memory device is stored within a destination data storage device indicated by the received destination value. Once stored, control flow returns to process block 422, as depicted in FIG. 12.

Figure 15:
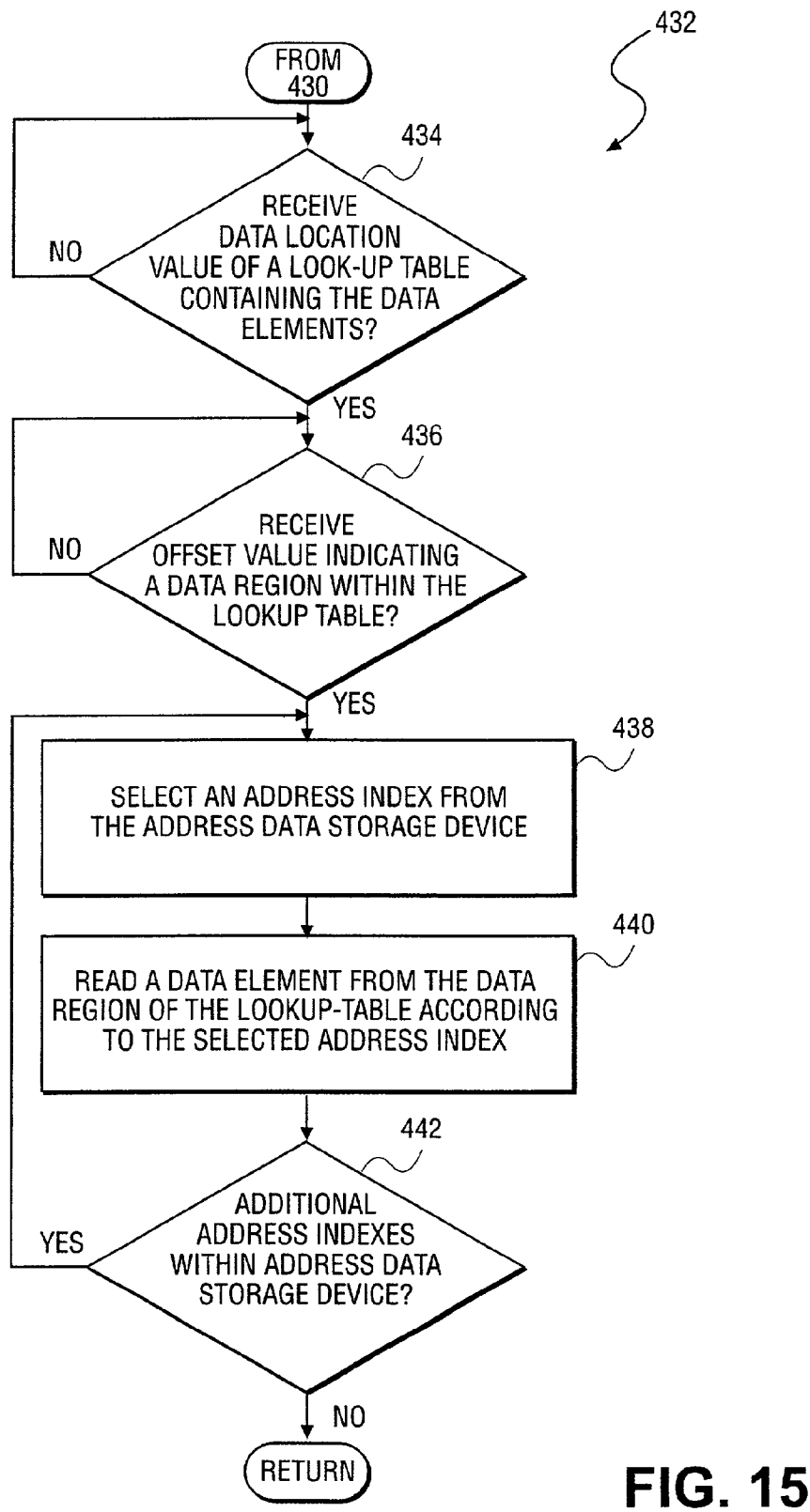
FIG. 15 depicts a flowchart illustrating an additional method for reading elements according to addresses contained within an address storage device in accordance with a further embodiment of the present invention.

Referring now to FIG. 15, FIG. 15 depicts a flowchart illustrating additional method 432 for reading data elements of process block 430, as depicted in FIG. 14. At process block 432, it is determined whether a data location value of a look-up table containing the data elements has been received. Once received, at process block 436, it is determined whether an offset value indicating a data region within the look-up table is received. Once received, an address index is selected from the address storage device, at process block 438. Once selected, at process block 440, a data element is read from the data region of the look-up table according to the selected address index. Next, at process block 442, process blocks 438 and 440 are repeated for each address index within the address data storage device. Once completed, control flow returns to process block 430, as depicted in FIG. 14.

Figure 16:
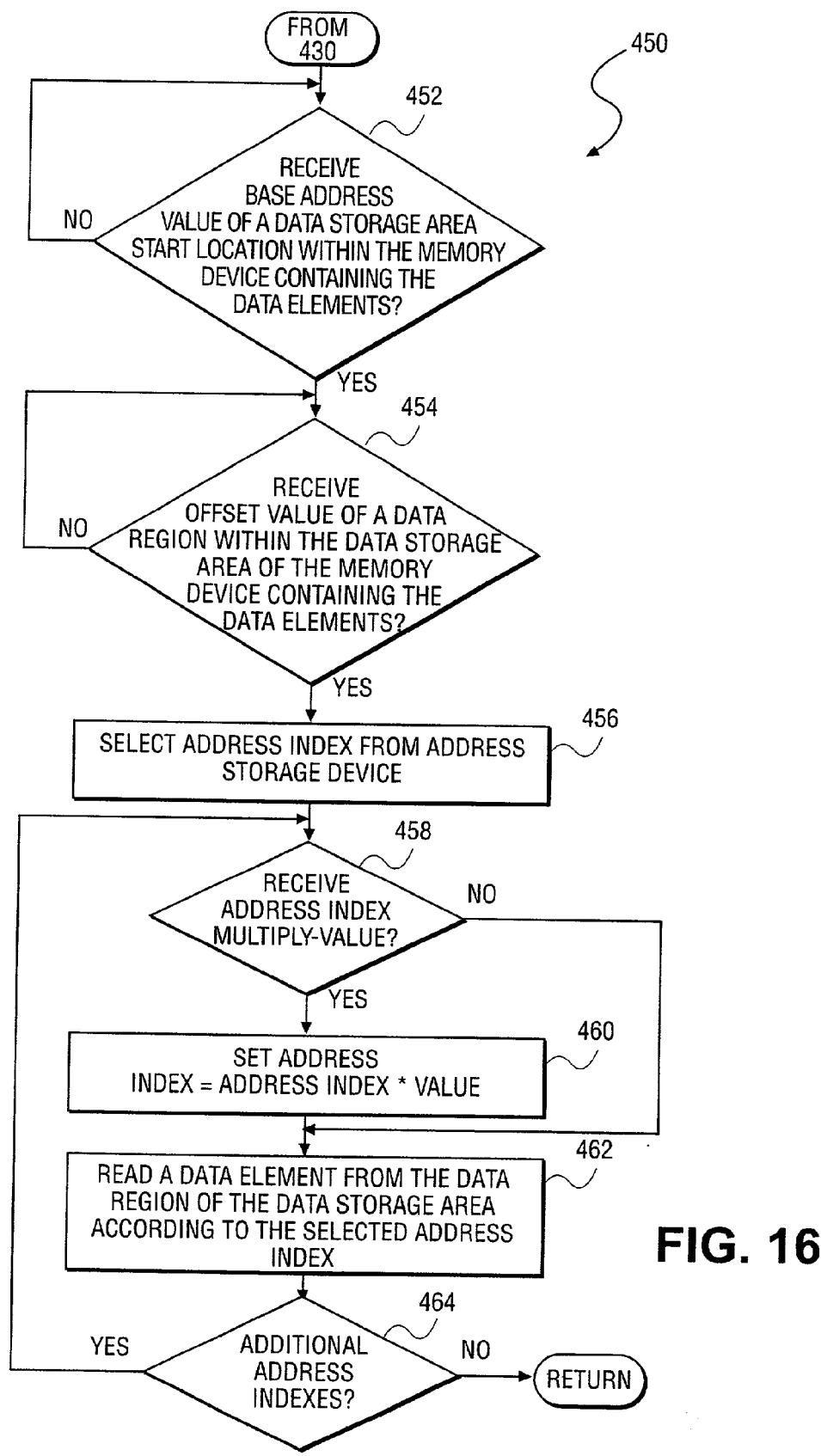
FIG. 16 depicts a flowchart illustrating an additional method for reading data elements according to address information contained within an address storage device in accordance with a further embodiment of the present invention.

Referring now to FIG. 16, FIG. 16 depicts a flowchart illustrating an additional method 450 for reading data elements for each address within the address storage device of process block 430 within a conventional cached memory or other memory device. At process block 452, it is determined whether a base address value of a data storage area within a memory device containing the data elements is received. Once received, at process block 454, it is determined whether an offset value of a data region within the memory device containing the data elements is received. Once received, an address index from the address storage device is selected, at process block 456.

Next, at process block 458, it is determined whether an address index multiply value is received. As described above, the address index multiply value is utilized to access data element data types which are greater than a byte data size, such as word, doubleword and quad-words. When a multiply value is received, at process block 460, the address index value is set equal to the address index value multiplied by the received multiply value. Next, whether a multiply value is received or not, a data element is read from the data region of the data storage area according to the selected address index. Finally, at process block 464, process blocks 458–462 are repeated for each address index within the address storage device.

Figure 17:
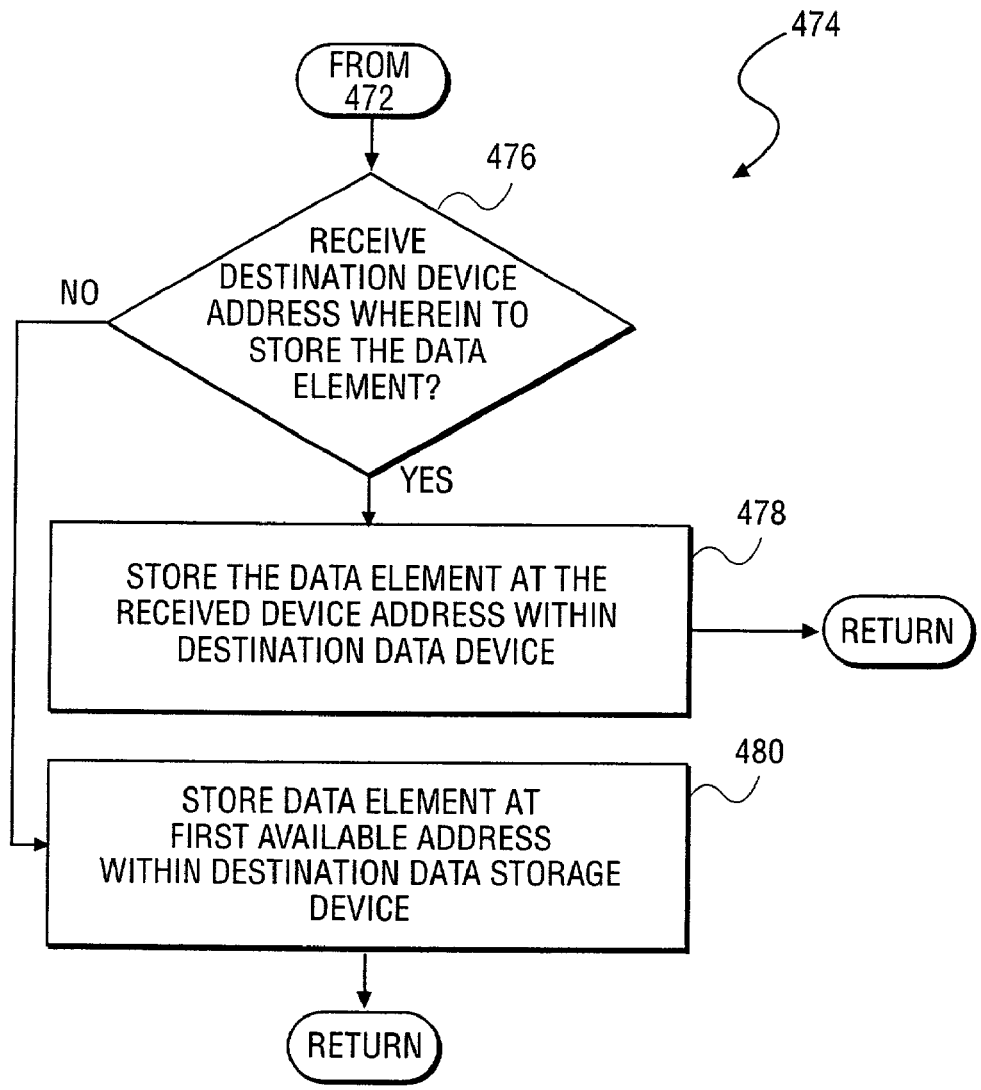
FIG. 17 depicts a flowchart illustrating an additional method for storing data elements in accordance with a further embodiment of the present invention.

Referring now to FIG. 17, FIG. 17 depicts a flowchart illustrating an additional method 474 for storing data elements within the destination data storage device. At process block 476, it is determined whether a destination device address is received, which indicates a location within the data storage device to store the data elements. Once received, at process block 478, the data element is stored at the received device address within the destination data device. Otherwise, the data element is simply stored at a first available address within the destination data storage device. Once completed, control flow returns to process block 472, as depicted in FIG. 14.

Figure 18:
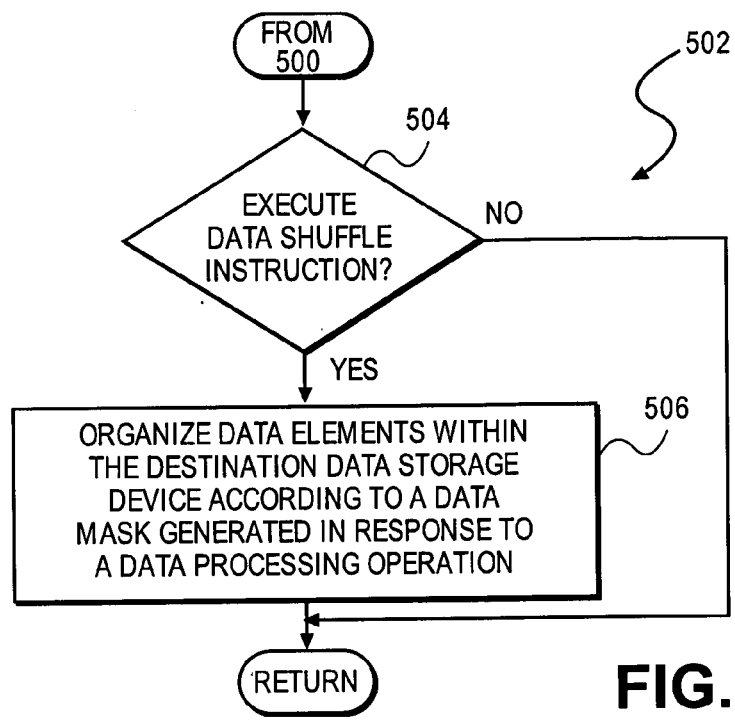
FIG. 18 depicts a flowchart illustrating an additional method for shuffling data within a data storage device in accordance with an exemplary embodiment of the present invention.

Referring now to FIG. 18, FIG. 18 depicts an additional method 502 for reorganizing address indexes within an address storage device, for example as depicted in FIG. 11. At process block 504, it is determined whether a data shuffle instruction has been executed. Once executed, at process block 506, data elements within the destination data storage device 310 are organized according to a data mask 350 generated in response to a data processing operation, for example, as depicted in FIG. 11. Generally, data shuffle instructions are utilized in order to facilitate parallel data calculation functions, such as for example, multiply-accumulate instructions as well as additional computational instructions.

Figure 19:
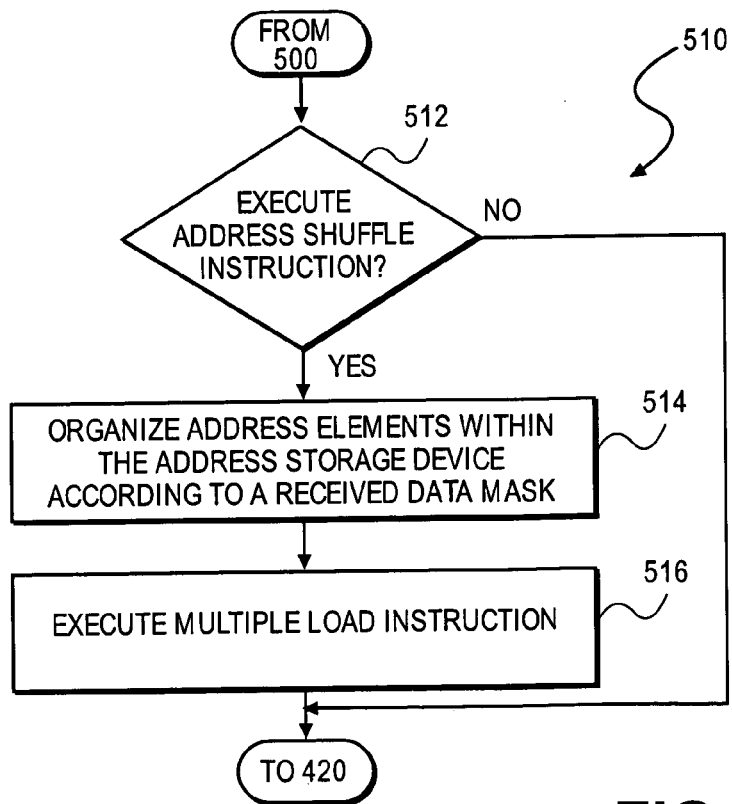
FIG. 19 depicts a flowchart illustrating an additional method for shuffling address information within an address storage device in accordance with an exemplary embodiment of the present invention.

Finally, referring to FIG. 19, FIG. 19 depicts a flowchart illustrating an additional method 510 for reordering address elements within the address storage device in response to a desired data processing operation (see FIG. 11). Accordingly, at process block 512, it is determined whether an address shuffle instruction is executed. In response to execution of an address shuffle instruction, at process block 514, address elements within the address storage device are organized according to a received data mask. Otherwise, at process block 512, control flow returns to process block 500, as depicted in FIG. 12. At process block 516, once the address elements are organized, a multiple data load instruction is executed. Once executed, control flow branches to process block 420, as depicted in FIG. 12.

Alternate Embodiments

Several aspects of one implementation of the computing architecture for providing a load of multiple, randomly distributed data have been described. However, various implementations of the multiple data load operations provide numerous features including, complementing, supplementing, and/or replacing the features described above. Features can be implemented as part of the computing architecture or as part of application specific hardware and software components in different implementations. In addition, the foregoing description, for purposes of explanation, used specific nomenclature to provide a thorough understanding of the invention. However, it will be apparent to one skilled in the art that the specific details are not required in order to practice the invention.

In addition, although an embodiment described herein is directed to a multiple data load operation, it will be appreciated by those skilled in the art that the teaching of the present invention can be applied to other systems. In fact, systems utilizing look-up tables which contain computationally intensive results are within the teachings of the present invention, without departing from the scope and spirit of the present invention. The embodiments described above were chosen and described in order to best explain the principles of the invention and its practical applications. These embodiment were chosen to thereby enable others skilled in the art to best utilize the invention and various embodiments with various modifications as are suited to the particular use contemplated.

It is to be understood that even though numerous characteristics and advantages of various embodiments of the present invention have been set forth in the foregoing description, together with details of the structure and function of various embodiments of the invention, this disclosure is illustrative only. In some cases, certain subassemblies are only described in detail with one such embodiment. Nevertheless, it is recognized and intended that such subassemblies may be used in other embodiments of the invention. Changes may be made in detail, especially matters of structure and management of parts within the principles of the present invention to the full extent indicated by the broad general meaning of the terms in which the appended claims are expressed.

The present invention provides many advantages over known techniques. The present invention includes the ability to load data which is randomly distributed within data storage areas of a memory device into a destination data storage device. Accordingly, data access instructions, which are utilized for performing communications or encryption algorithms, are significantly reduced. In addition, processor buses utilizing the teachings of the present invention transmit only data that can be used. As a result, the present invention targets the problem of cache access times, which increasingly lag behind access times for computation by an arithmetic logic unit. Accordingly, the memory bottleneck created by cached line access times, which is in direct opposition to the increasing clock frequencies in future processors, is avoided. Consequently, the present invention improves performance by reducing the number of clock cycles for applications that utilize look-up tables. In addition, power is saved by the present invention due to the fact that power tends to increase linearly with the number of clock cycles. Therefore, due to the fact that the present invention reduces the number of clock cycles, power consumption is also reduced.

Having disclosed exemplary embodiments and the best mode, modifications and variations may be made to the disclosed embodiments while remaining within the scope of the invention as defined by the following claims.

What is claimed is:

1. A method comprising:
   receiving a multiple-data load instruction;
   executing the multiple-data load instruction; and
   loading, in response to execution of the multiple-data load instruction, data within a destination data storage device, wherein one or more data elements from the data are randomly located within a source memory device.

2. The method of claim 1, wherein loading data further comprises:

receiving a source value indicating the memory device wherein the data is located;

receiving a device value indicating an address storage device containing addresses of the data elements;

reading, from the memory device, a data element for each address within the address storage device;

receiving a destination value indicating the destination data storage device wherein to load the data elements; and storing each data element read from the memory device into the destination data storage device.

3. The method of claim 2, wherein reading the data element further comprises:

receiving a table value indicating a look-up table within the memory device wherein the data elements are initially stored;

receiving an offset value indicating a data region within a respective look-up table wherein the data elements are initially stored;

selecting an address index from the address data storage device;

reading a data element from the data region of the look-up table according to the selected address index; and repeating the selecting and reading from each address index within the address data storage device.

4. The method of claim 2, wherein reading a data element further comprises:

receiving a memory access data type value indicating a data type of the data;

receiving a base address value indicating a start location of a data storage area within the memory device wherein the data elements are initially stored;

receiving an offset value indicating a data region within the data storage area wherein the data elements are initially stored;

selecting an address index from the address data storage device;

when a multiply value is received, setting the selected address index equal to the selected address index multiplied by the multiply value according to the data type of the data;

reading a data element from the data region of the data storage area according to the selected address index; and repeating the selecting and reading from each address index within the address data storage device.

5. The method of claim 4, further comprising:

receiving an address index data type, indicating a data type of the address indexes within the address storage device as one of a byte data type, a word data type and a double word data type.

6. The method of claim 4, wherein the memory access data type is one of a byte data type, a word data type and a double word data type.

7. The method of claim 2, wherein receiving a destination value further comprises:

receiving, for one or more data elements, an address location within the destination data storage device wherein to store a respective data element.

8. The method of claim 1, wherein addresses of the data elements are stored within an address data storage device, and prior to loading the data, the method further comprises:

organizing, in response to executing a data shuffle instruction, address elements within the address data storage device according to a data processing operation.

9. The method of claim 1, further comprising:

organizing, in response to executing a data shuffle instruction, data elements within the destination data storage device according to a data processing operation.

10. The method of claim 1, further comprising:

processing, in response to executing a data processing instruction, data elements within the destination data storage device according to the data processing instruction.

11. A machine readable storage medium including program instructions that direct a system to function in a specified manner when executed by a processor, the program instructions comprising:

loading, in response to execution of a multiple-data load instruction, data from at least one data storage area of a memory device to a destination data storage device, wherein one or more data elements from the data are randomly located within the memory device.

12. The machine readable storage medium of claim 11, wherein loading data further comprises:

receiving a source value indicating the memory device wherein the data is located;

receiving a device value indicating an address data storage device containing addresses of the data elements;

reading, from the memory device, a data element for each address within the address storage device;

receiving a destination value indicating the destination data storage device wherein to load the data elements; and storing each data element read from the memory device into the destination data storage device.

13. The machine readable storage medium of claim 12, wherein reading a data element further comprises:

receiving a table value indicating a look-up table within the memory device wherein the data elements are initially stored;

receiving an offset value indicating a data region within a respective look-up table wherein the data elements are initially stored;

selecting an address index from the address data storage device;

reading a data element from the data region of the look-up table according to the selected address index; and repeating the selecting and reading from each address index within the address data storage device.

14. The machine readable storage medium of claim 12, wherein reading a data element further comprises:

receiving a memory access data type value indicating a data type of the data;

receiving a base address value indicating a start location of a data storage area within the memory device wherein the data elements are initially stored;

receiving an offset value indicating a data region within a respective data storage area wherein the data elements are initially stored;

selecting an address index from the address storage device;

when a multiply value is received, setting the selected address index equal to the selected address index multiplied by the multiply value according to the data type of the data;

reading a data element from the data region of the data storage area according to the selected address index; and repeating the selecting and reading from each address index within the address data storage device.

15. The machine readable storage medium of claim 14, further comprising:

receiving an address index data type, indicating a data type of the address indexes within the address storage device as one of a byte data type, a word data type and a double word data type.

16. The machine readable storage medium of claim 14, wherein the memory access data type is one of a byte data type, a word data type and a double word data type.

17. The machine readable storage medium of claim 12, wherein receiving a destination value further comprises:
receiving, for one or more data elements, an address location within the destination data storage device wherein to store a respective data element.

18. The machine readable storage medium of claim 11, wherein addresses of the one or more data elements are stored within an address data storage device, and prior to loading the data, the method further comprises:
organizing, in response to executing a data shuffle instruction, address elements within the address data storage device according to a data processing operation.

19. The machine readable storage medium of claim 11, further comprising:
organizing, in response to executing a data shuffle instruction, data elements within the destination data storage device according to a data processing operation.

20. The machine readable storage medium of claim 11, further comprising:
processing, in response to executing a data processing instruction, data element within the destination data storage device according to the data processing instruction.

21. An apparatus, comprising:
a processor having an execution unit to execute instructions;
a memory device including one or more data storage areas to contain data generated during apparatus initialization;
a register file coupled to the processor, including an address data storage device including address indexes of data elements within a respective data storage area within the memory device; and
the execution unit to load, in response to execution of a multiple-data load instruction, data from the one or more data storage areas of the memory device to a destination data storage device, wherein one or more data elements from the data are randomly stored within the memory device.

22. The apparatus of claim 21, further comprising:
a storage device coupled to the processor, having sequences of instructions stored therein, which when executed by the execution unit cause the processor to:
generate data elements according to a data generation instruction; and
store the data elements within the one or more data storage areas of the memory device.

23. The apparatus of claim 21, wherein the multiple data load instruction further causes the execution unit to:
select a data storage area within the memory device based on a received data storage area value;
calculate a location of a respective data element within the selected data storage area;
read the respective data element from the calculated location; and
store the respective data element within the destination data storage device.

24. The apparatus of claim 23, wherein the instruction to store the respective data further causes the execution unit to:
store the respective data element at a received address location within the destination data storage device.

25. The apparatus of claim 23, wherein the instruction to calculate the location of the respective data element further causes the execution unit to:

receive a device value indicating an address storage device containing the addresses of the data elements;
receive a table value indicating a look-up table within the memory device wherein the data elements are initially stored; and
receive an offset value indicating a data region within a respective look-up table, wherein the data elements are initially stored such that the location of the respective data element is calculated as an address index of the respective data element within the look-up table.

26. The apparatus of claim 23, wherein instruction to calculate the location of the respective data element further causes the execution unit to:
receive a memory access data type value indicating a data type of the data;
receive a base address value indicating a start location of a data storage area within the memory device wherein the data elements are initially stored;
receive a device value indicating an address storage device containing the addresses of the data elements including a multiply value indicating a value which is multiplied to address indexes within the address data storage device according to the memory access data type of the data;
receive an offset value indicating a data region within a respective data storage area, wherein the data elements are initially stored such that the location of the respective data element is calculated as an address index of the respective data element within the data region.

27. The apparatus of claim 21, further comprising:
a data shuffle unit coupled between the register file and the execution unit, the data shuffle unit to organize, in response to execution of an address shuffle instruction, address elements within the address data storage device according to a data processing operation and to organize, in response to executing a data shuffle instruction, data elements within the destination data storage device according to a data processing operation.

28. A system comprising:
a processor having an execution unit to execute instructions;
a memory device including one or more data storage areas to store data generated during application initialization;
a register file coupled to the execution unit, including an address data storage device including address indices of data elements within a respective data storage area of the memory device;
a data shuffle unit coupled between the register file and the execution unit, the data shuffle unit to organize, in response to execution of an address shuffle instruction, address elements within the address data storage device according to a data processing operation and to organize, in response to executing a data shuffle instruction, data elements within the destination data storage device according to a data processing operation; and
the execution unit to load, in response to execution of a multiple data load instruction, data from at least one data storage area of the memory device to the destination data storage device, wherein one or more data elements from the data are randomly stored within the memory device.

* * * * *

UNITED STATES PATENT AND TRADEMARK OFFICE
CERTIFICATE OF CORRECTION

PATENT NO. : 7,162,607 B2
APPLICATION NO. : 09/945422
DATED : January 9, 2007
INVENTOR(S) : Macy et al.

Page 1 of 1

It is certified that error appears in the above-identified patent and that said Letters Patent is hereby corrected as shown below:

In column 6, at line 51, delete "performs" and insert --perform--.
In column 7, at line 1, delete ":" and insert --;--.
In column 8, at line 30, delete "6G." and insert --6C.--.

Signed and Sealed this

Twenty Second Day of April, 2008

JON W. DUDAS
*Director of the United States Patent and Trademark Office*